United States Patent
Addanki et al.

(10) Patent No.: US 10,199,697 B2
(45) Date of Patent: Feb. 5, 2019

(54) SEALED BATTERY PACK DESIGNS

(71) Applicant: FORD GLOBAL TECHNOLOGIES, LLC, Dearborn, MI (US)

(72) Inventors: Hari Addanki, Novi, MI (US); Steve F. Chorian, Canton, MI (US); George Albert Garfinkel, Westland, MI (US); Keith Kearney, Grosse Ile, MI (US); Kevin A. Montgomery, Royal Oak, MI (US); Chi Paik, Grosse Ile, MI (US); Chung-hsing Kuo, Ann Arbor, MI (US); Jeffrey Matthew Haag, Detroit, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 28 days.

(21) Appl. No.: 15/163,708

(22) Filed: May 25, 2016

(65) Prior Publication Data
US 2017/0346144 A1 Nov. 30, 2017

(51) Int. Cl.
*H01M 2/10* (2006.01)
*H01M 10/6551* (2014.01)
*H01M 10/613* (2014.01)
*H01M 10/625* (2014.01)

(52) U.S. Cl.
CPC ..... *H01M 10/6551* (2015.04); *H01M 2/1077* (2013.01); *H01M 10/613* (2015.04); *H01M 10/625* (2015.04); *H01M 2220/20* (2013.01)

(58) Field of Classification Search
CPC ............ H01M 2/204; H01M 10/5004; H01M 2/1022; H01M 2220/30; H01M 10/6568; H01M 10/613; H01M 10/625; H01M 10/6551; H01M 2220/20
See application file for complete search history.

(56) References Cited

U.S. PATENT DOCUMENTS

| | | | |
|---|---|---|---|
| 5,620,057 A * | 4/1997 | Klemen | B60K 1/04 180/65.1 |
| 8,387,733 B2 | 3/2013 | Nakamura | |
| 8,512,887 B2 | 8/2013 | Reybum et al. | |
| 8,741,466 B2 | 6/2014 | Youngs et al. | |
| 2013/0280566 A1* | 10/2013 | Chung | H01M 10/613 429/83 |
| 2014/0377622 A1* | 12/2014 | Glauning | H01M 10/613 429/120 |
| 2015/0207186 A1 | 7/2015 | Schmidt et al. | |
| 2016/0020447 A1 | 1/2016 | Janarthanam et al. | |
| 2017/0229749 A1* | 8/2017 | Rawlinson | H01M 10/6568 |

* cited by examiner

*Primary Examiner* — Cynthia H Kelly
*Assistant Examiner* — Monique M Wills
(74) *Attorney, Agent, or Firm* — Carlson, Gaskey & Olds

(57) ABSTRACT

An exemplary battery pack includes a battery assembly and an enclosure assembly housing the battery assembly. The enclosure assembly is arranged to dissipate heat from at least two sides of the battery assembly.

18 Claims, 4 Drawing Sheets

SEALED BATTERY PACK DESIGNS

TECHNICAL FIELD

This disclosure relates to battery packs for electrified vehicles. An exemplary battery pack includes an enclosure assembly having features for dissipating heat from one or more sides of a battery assembly housed inside the enclosure assembly.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to power and propel the vehicle.

A high voltage battery pack typically powers the electric machines and other electrical loads of the electrified vehicle. The battery pack includes a plurality of interconnected battery cells that store energy for powering these electrical loads. The battery cells release heat during charging and discharging operations. In some instances, it is desirable to dissipate this heat from the battery pack to improve the capacity and life of the battery cells.

SUMMARY

A battery pack according to an exemplary aspect of the present disclosure includes, among other things, a battery assembly and an enclosure assembly housing the battery assembly and arranged to dissipate heat from at least two sides of the battery assembly.

In a further non-limiting embodiment of the foregoing battery pack, the enclosure assembly includes a tray and a cover attached to the tray.

In a further non-limiting embodiment of either of the foregoing battery packs, the tray includes a first coolant chamber configured to dissipate heat from a first side of the battery assembly and a second coolant chamber configured to dissipate heat from a second side of the battery assembly.

In a further non-limiting embodiment of any of the foregoing battery packs, the tray includes a third coolant chamber configured to dissipate heat from a third side of the battery assembly.

In a further non-limiting embodiment of any of the foregoing battery packs, the battery assembly is mounted to a floor of a tray of the enclosure assembly.

In a further non-limiting embodiment of any of the foregoing battery packs, a first thermal interface material (TIM) is between the battery assembly and the floor.

In a further non-limiting embodiment of any of the foregoing battery packs, a second thermal interface material (TIM) is between the battery assembly and a sidewall of the tray.

In a further non-limiting embodiment of any of the foregoing battery packs, a first coolant chamber is between the floor and a close-out panel of the enclosure assembly and a second coolant chamber inside the sidewall.

In a further non-limiting embodiment of any of the foregoing battery packs, the enclosure assembly includes an internal compartment for housing the battery assembly and a coolant chamber that is isolated from the internal compartment.

In a further non-limiting embodiment of any of the foregoing battery packs, the enclosure assembly includes a cast or extruded tray and a stamped cover.

In a further non-limiting embodiment of any of the foregoing battery packs, the enclosure assembly includes a tray having a floor and the battery assembly is positioned atop the floor.

In a further non-limiting embodiment of any of the foregoing battery packs, a plurality of integrated heat transfer devices protrude from the floor in a direction opposite from the battery assembly or are disposed inside a hollow sidewall of the enclosure assembly.

In a further non-limiting embodiment of any of the foregoing battery packs, a close-out panel is mounted beneath the plurality of integrated heat transfer devices. A first coolant chamber is established between the floor and the close-out panel.

In a further non-limiting embodiment of any of the foregoing battery packs, a sidewall extends vertically relative to the floor, and a second coolant chamber extends inside the sidewall.

In a further non-limiting embodiment of any of the foregoing battery packs, a center rail is disposed between the battery assembly and a second battery assembly, and a third coolant chamber extends inside the center rail.

A method according to another exemplary aspect of the present disclosure includes, among other things, housing a battery assembly within an enclosure assembly of a battery pack such that the enclosure assembly is arranged to facilitate heat transfer with at least a first side and a second side of the battery assembly.

In a further non-limiting embodiment of the foregoing method, the first side is a bottom side of the battery assembly and the second side is an outboard side of the battery assembly.

In a further non-limiting embodiment of either of the foregoing methods, the enclosure assembly is arranged to facilitate heat transfer with a third side of the battery assembly, and the third side is an inboard side of the battery assembly.

In a further non-limiting embodiment of any of the foregoing methods, the method includes directing coolant through a first coolant chamber of the enclosure assembly to facilitate the heat transfer.

In a further non-limiting embodiment of any of the foregoing methods, directing the coolant includes communicating the coolant across a plurality of heat transfer devices disposed inside the first coolant chamber.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. An exemplary battery pack includes a battery assembly housed inside an enclosure assembly. In some embodiments, the enclosure assembly includes a tray and a cover mountable to the tray to house the battery assembly. In other embodiments, the enclosure assembly is arranged to dissipate heat from at least two sides of the battery assembly. These and other features are discussed in greater detail in the following paragraphs of this detailed description.

Figure 1:
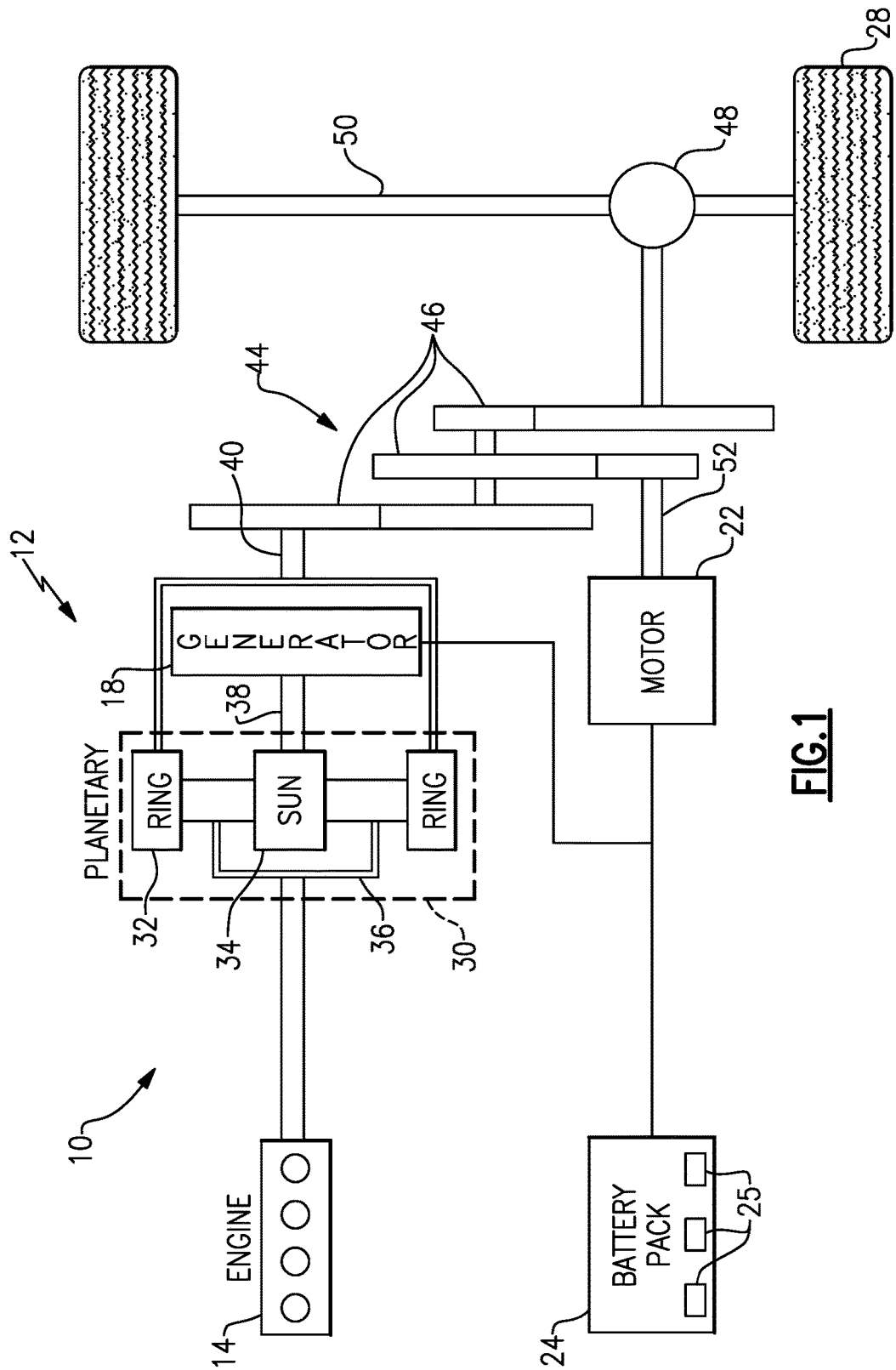
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2A:
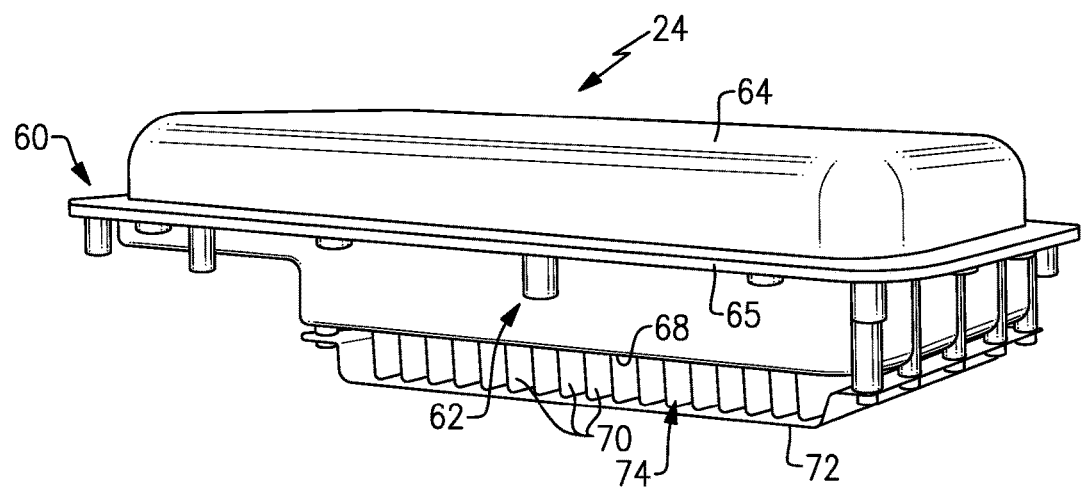
FIGS. 2A and 2B illustrate a battery pack according to a first embodiment of this disclosure.
Figure 2B:
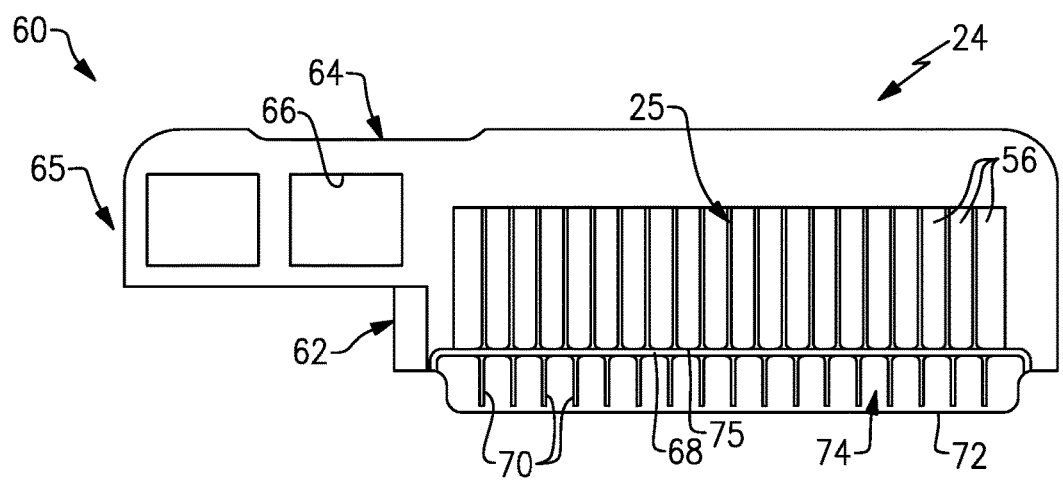

FIGS. 2A and 2B illustrate a battery pack 24 that can be employed within an electrified vehicle. For example, the battery pack 24 could be part of the electrified vehicle 12 of FIG. 1. FIG. 2A is a perspective view of the battery pack 24, whereas FIG. 2B is a cross-sectional view illustrating the internal contents of the battery pack 24.

The battery pack 24 includes a plurality of battery cells 56 (see FIG. 2B) that store electrical power for powering various electrical loads of the electrified vehicle 12. Although a specific number of battery cells 56 are depicted in FIG. 2B, the battery pack 24 could employ a greater or fewer number of battery cells within the scope of this disclosure. In other words, this disclosure is not limited to the specific configuration shown in FIGS. 2A and 2B.

The battery cells 56 may be stacked side-by-side along a longitudinal axis to construct a grouping of battery cells 56, sometimes referred to as a "cell stack." The battery pack 24 can include one or more separate groupings of battery cells 56.

In a non-limiting embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any other support structures (e.g., spacers, rails, walls, plates, bindings, etc.), may collectively be referred to as a battery assembly 25. A single battery assembly 25 is shown in FIG. 2B; however, the battery pack 24 could include a greater or fewer number of battery assemblies within the scope of this disclosure. For example, the battery packs of FIGS. 3-6 each include multiple battery assemblies.

An enclosure assembly 60 houses each battery assembly 25 of the battery pack 24. In a non-limiting embodiment, the enclosure assembly 60 is a sealed enclosure that includes a tray 62 and a cover 64. The cover 64 is attachable to the tray 62 to enclose the battery assemblies 25 and various other electronic modules 66 of the battery pack 24. The electronic modules 66 may include a battery energy control module (BECM) and various other electronics.

The cover 64 may be attached to the tray 62 in any known manner. In a non-limiting embodiment, the cover 64 is mechanically fastened to the tray 62 using one or more fasteners. The enclosure assembly 60 may be sealed along a flange 65 that is located where the tray 62 and the cover 64 meet using a gasket or any other sealing mechanism.

The enclosure assembly 60 could be constructed in a variety of ways using a combination of materials and forming methods. Non-limiting examples of suitable forming methods include stamping, extrusion, casting, and molding. In a non-limiting embodiment, the tray 62 is a cast aluminum tray and the cover 64 is a stamped steel cover. However, other combinations of materials and forming methods are also contemplated within the scope of this disclosure.

The battery assembly 25 may be mounted to a portion of the tray 62. For example, in a non-limiting embodiment, the battery assembly 25 is received against/mounted to a floor 68 of the tray 62. The battery assembly 25 could be mounted to any wall or surface of either the tray 62 or the cover 64.

In another non-limiting embodiment, a thermal interface material (TIM) 75 is disposed between the battery assembly 25 and the floor 68. The TIM 75 maintains thermal contact between the battery cells 56 of the battery assembly 25 and the floor 68 of the tray 62 and increases the thermal conductivity between these neighboring components during heat transfer events. The TIM 75 therefore facilitates heat transfer from the battery cells 56 (i.e., the heat sources) to the enclosure assembly 60 (i.e., the heat sink). The TIM 75 may be any known thermally conductive material.

A plurality of integrated heat transfer devices 70 may protrude from the floor 68 in a direction away from the battery assembly 25 (i.e., outside of the enclosure assembly 60). The integrated heat transfer devices 70 can be configured as cooling fins, cooling pins, or any other heat transfer device. The integrated heat transfer devices 70 help dissipate the heat that is conducted from the battery cells 56 to the enclosure assembly 60, or could facilitate adding heat to the battery cells 56 during conditions where the battery cells 56 requiring heating.

A close-out panel 72 may optionally be secured to the tray 62 on an opposite side of the enclosure assembly 60 from the cover 64. In a non-limiting embodiment, the close-out panel 72 is mounted (e.g., bolted) to the tray 62 at a location beneath the heat transfer devices 70 to establish a coolant chamber 74. The coolant chamber 74 extends between the close-out panel 72 and the floor 68 of the tray 62. A medium, such as air, liquid, or refrigerant, may be communicated through the coolant chamber 74 to dissipate heat from or add heat to the battery cells 56 of the battery assembly 25.

As shown, the floor 68 of the enclosure assembly 60 structurally separates the coolant chamber 74 from the internal compartment of the enclosure assembly 60 where the battery assembly 25 and the various electronic modules 66 are housed. This design substantially eliminates the need for complicated internal sealing structures for separating the coolant of the coolant chamber 74 from potential vent gases of the battery cells 56.

FIGS. 2A and 2B illustrate an exemplary thermal management configuration for cooling a single side (e.g., the bottom side) of the battery assembly 25. However, other configurations are also contemplated in which heat can be dissipated from multiple sides of the battery assembly 25. Examples of such battery pack designs are described and illustrated below with reference to FIGS. 3, 4, 5, and 6.

Figure 3:
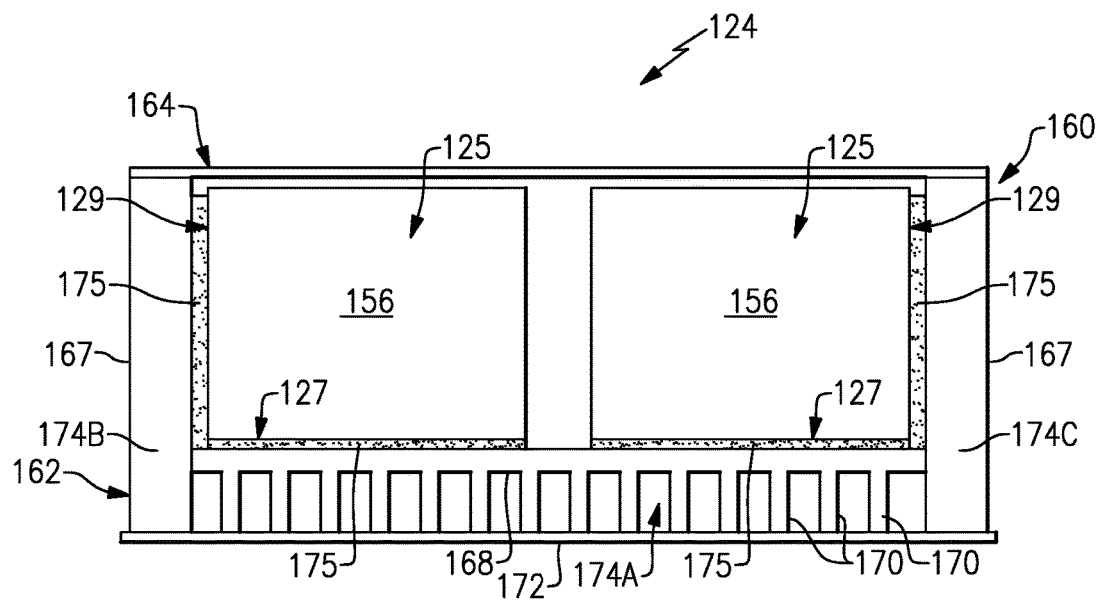
FIG. 3 illustrates a battery pack according to a second embodiment of this disclosure.

Referring first to FIG. 3, for example, a battery pack 124 includes an enclosure assembly 160 that houses multiple battery assemblies 125. The enclosure assembly 160 includes a tray 162, a cover 164, and a close-out panel 172, which are each separate components of the enclosure assembly 160. In a non-limiting embodiment, the tray 162 is a cast or extruded part made of aluminum or steel, the cover 164 is a stamped part made of aluminum or steel, and the close-out panel 172 is a stamped or molded part made of metal or plastic.

The tray 162 of this embodiment includes a monolithic design having a horizontally extending floor 168 that extends between vertically extending sidewalls 167. The battery assemblies 125 are positioned atop the floor 168, and the sidewalls 167 extend in proximity to outboard sides 129 of each battery assembly 125. The tray 162 is arranged to facilitate heat transfer with multiple sides of each battery assembly 125. For example, a bottom side 127 of each battery assembly 125 may release heat to the floor 168 of the tray 162 and the outboard side 129 of each battery assembly 125 may release heat to one of the sidewalls 167 of the tray 162. A TIM 175 may be disposed between each battery assembly 125 and the floor 168 and between the battery assemblies 125 and each sidewall 167 to conduct heat out of the battery cells 156 of the battery assemblies 125.

A plurality of heat transfer devices 170 extend between the floor 168 and the close-out panel 172 to establish a first coolant chamber 174A of the enclosure assembly 160. The heat transfer devices 170 are integrated features of the tray 162, in this non-limiting embodiment. The close-out panel 172 may be bolted or otherwise fastened to each sidewall 167 of the tray 162 to establish the first coolant chamber 174A.

In another non-limiting embodiment, the sidewalls 167 of the tray 162 include one or more hollow sections for establishing a second coolant chamber 174B and a third coolant chamber 174C of the enclosure assembly 160. A medium such as coolant, air, refrigerant, etc. may be communicated through each coolant chamber 174A, 174B, and 174C to dissipate heat from multiple sides of each battery assembly 125 by forced convection. For example, in this non-limiting embodiment, heat can be dissipated from both the bottom side 127 and the outboard sides 129 of the battery assemblies 125. In an alternative embodiment, heat may be added to these sides.

Figure 4:
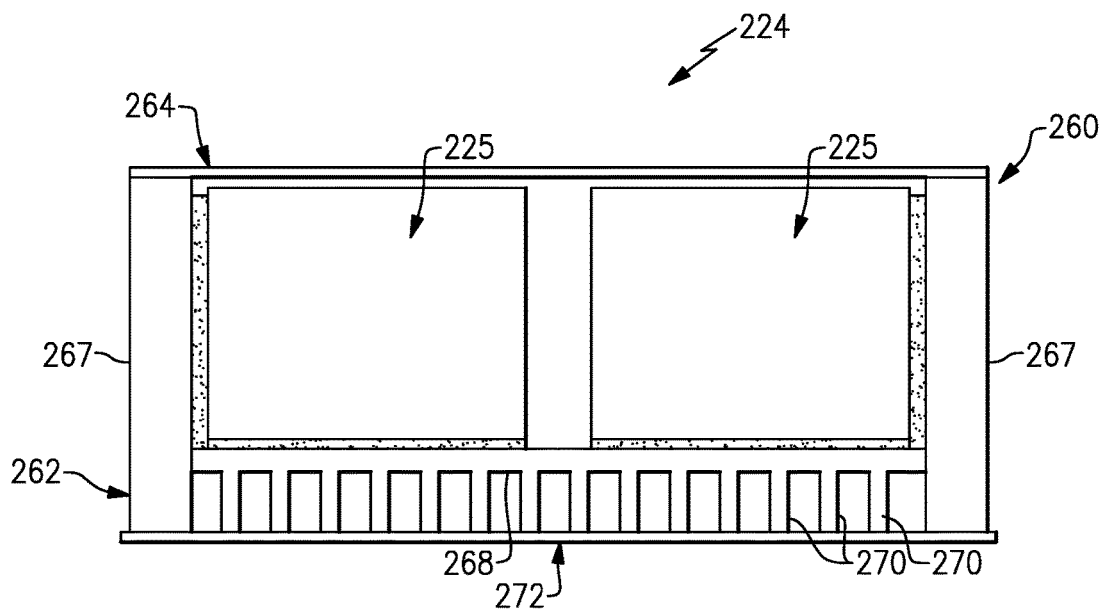
FIG. 4 illustrates a battery pack according to a third embodiment of this disclosure.

FIG. 4 illustrates another exemplary battery pack 224. The battery pack 224 includes an enclosure assembly 260 that houses multiple battery assemblies 225. The enclosure assembly 260 includes a tray 262 and a cover 264. Unlike the FIG. 3 embodiment; however, a close-out panel 272 of the enclosure assembly 260 is an integrated part of the tray 262 rather than a separate piece that is mechanically fastened to the tray 262. Therefore, in this non-limiting embodiment, a floor 268, sidewalls 267, heat transfer devices 270, and the close-out panel 272 establish a single-piece, monolithic tray, such as an extruded tray, for housing and thermally managing the battery assemblies 225.

Figure 5:
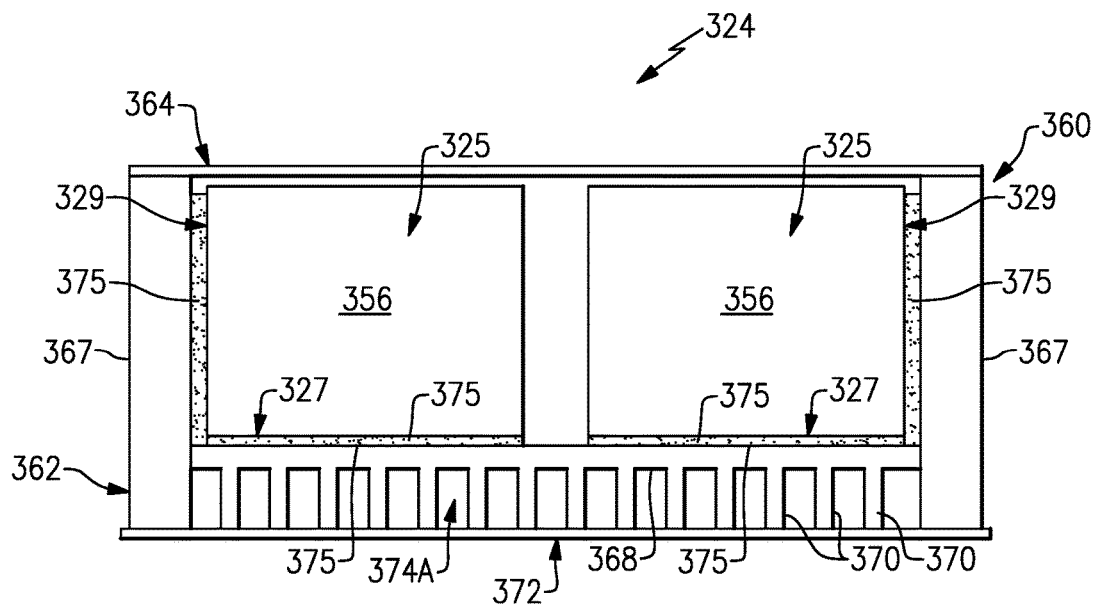
FIG. 5 illustrates a battery pack according to another embodiment of this disclosure.

Another exemplary battery pack 324 is illustrated in FIG. 5. The battery pack 324 includes an enclosure assembly 360 that houses multiple battery assemblies 325. The enclosure assembly 360 includes a tray 362, a cover 364, and a close-out panel 372, which may be separate components of the enclosure assembly 360.

The tray 362 of this embodiment includes a monolithic design having a horizontally extending floor 368 that extends between vertically extending sidewalls 367. The battery assemblies 325 are positioned atop the floor 368, and the sidewalls 367 extend in proximity to outboard sides 329 of each battery assembly 325. The tray 362 is arranged to facilitate heat transfer with multiple sides of the battery assembly 325. For example, a bottom side 327 of each battery assembly 325 may release heat to the floor 368 of the tray 362 and the outboard side 329 of each battery assembly 325 may release heat to one of the sidewalls 367 of the tray 362. A TIM 375 may be disposed between each battery assembly 325 and the floor 368 and between the battery assemblies 325 and each sidewall 367 to conduct heat out of the battery cells 356 of the battery assemblies 325.

A plurality of heat transfer devices 370 extend between the floor 368 and the close-out panel 372 to establish a first coolant chamber 374A of the enclosure assembly 360. The heat transfer devices 370 are integrated features of the tray 362, in this non-limiting embodiment. The close-out panel 372 may be bolted or otherwise fastened to each sidewall 367 of the tray 362 to establish the first coolant chamber 374A. Coolant may be communicated through the coolant chamber 374A to dissipate heat from the bottom side 327 of each battery assembly 125 via forced convection. In yet another non-limiting embodiment, although not shown, heat transfer devices similar to the heat transfer devices 370 could be disposed within hollow portions of the sidewalls 367.

In yet another non-limiting embodiment, the sidewalls 367 of the tray 362 are solid rather than hollow and therefore do not establish additional coolant chambers of the enclosure assembly 360. Heat is dissipated from the outboard sides 329 of the battery assemblies 325 by conduction and natural convection.

Figure 6:
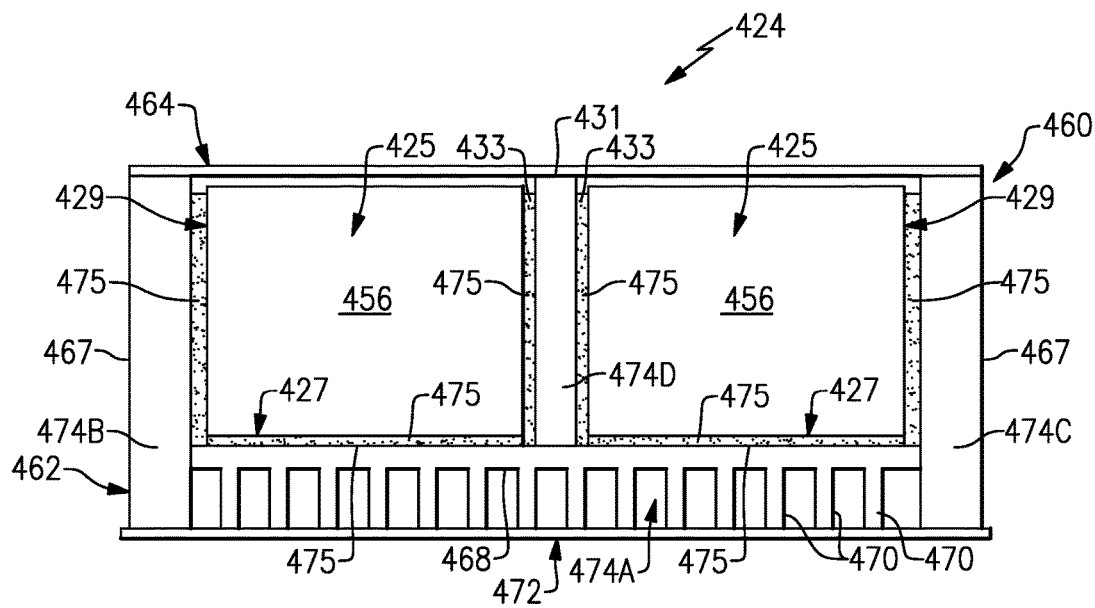
FIG. 6 illustrates a battery pack according to yet another embodiment of this disclosure.

FIG. 6 illustrates yet another battery pack 424. The battery pack 424 includes an enclosure assembly 460 that houses multiple battery assemblies 425. The enclosure assembly 460 includes a tray 462, a cover 464, and a close-out panel 472. The close-out panel 472 may be a separate component from the tray 462 or could alternatively be an integral component of the tray 462.

The tray 462 of this embodiment includes a monolithic design having a horizontally extending floor 468 that extends between vertically extending sidewalls 467. The battery assemblies 425 are positioned atop the floor 468, and the sidewalls 467 extend in proximity to outboard sides 429 of each battery assembly 425. The tray 462 may additionally include a center rail 431 positioned between the battery assemblies 425. In other words, the center rail 431 is adjacent to inboard sides 433 of each battery assembly 425.

The tray 462 is arranged to facilitate heat transfer with multiple sides of each battery assembly 425. For example, a bottom side 427 of each battery assembly 425 may release heat to the floor 468 of the tray 462, the outboard side 429 of each battery assembly 425 may release heat to one of the sidewalls 467 of the tray 462, and the inboard sides 433 of each battery assembly 425 may release heat to the center rail 431 of the tray 462. A TIM 475 may be disposed between each battery assembly 425 and the floor 468, the sidewalls 467, and the center rail 431 to conduct heat out of the battery cells 456 of the battery assemblies 425.

A plurality of heat transfer devices 470 extend between the floor 468 and the close-out panel 472 to establish a first coolant chamber 474A of the enclosure assembly 460. The heat transfer devices 470 are integrated features of the tray 462, in this non-limiting embodiment. In another non-limiting embodiment, the sidewalls 467 of the tray 462 include hollow sections that establish a second coolant chamber 474B and a third coolant chamber 474C of the enclosure assembly 460. In yet another non-limiting embodiment, the center rail 431 includes at least one hollow section that establishes a fourth coolant chamber 474D of the enclosure assembly 460.

Coolant may be communicated through each coolant chamber 474A, 474B, 474C, and 474D to dissipate heat from multiple sides of each battery assemblies 425 by forced convection. For example, in this non-limiting embodiment, heat is dissipated from each of the bottom sides 427, the outboard sides 429, and the inboard sides 433 of the battery assemblies 425.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a battery assembly;
   a sealed enclosure assembly housing said battery assembly and arranged to dissipate heat from said battery assembly wherein a tray of said enclosure assembly includes a first coolant chamber configured to dissipate heat from a first side of said battery assembly and a second coolant chamber configured to dissipate heat from a second side of said battery assembly;
   a first heat transfer device between said first side and a floor of said tray; and
   a second heat transfer device between said second side and a side wall of said tray.

2. The battery pack as recited in claim 1, wherein said enclosure assembly includes a cover attached to said tray.

3. The battery pack as recited in claim 1, wherein said tray includes a third coolant chamber configured to dissipate heat from a third side of said battery assembly.

4. The battery pack as recited in claim 1, wherein said battery assembly is mounted to said floor of said tray of said enclosure assembly.

5. The battery pack as recited in claim 1, wherein said first heat transfer device includes a first thermal interface material (TIM) between said battery assembly and said floor.

6. The battery pack as recited in claim 5, wherein said second heat transfer device includes a second thermal interface material (TIM) between said battery assembly and a sidewall of said tray.

7. The battery pack as recited in claim 6, comprising a first coolant chamber between said floor and a close-out panel of said enclosure assembly and a second coolant chamber inside said sidewall.

8. The battery pack as recited in claim 1, wherein said enclosure assembly includes an internal compartment for housing said battery assembly and a coolant chamber that is isolated from said internal compartment.

9. The battery pack as recited in claim 1, wherein said tray includes a cast or extruded tray and said enclosures assembly includes a stamped cover.

10. The battery pack as recited in claim 1, comprising a plurality of integrated heat transfer devices that protrude from said floor in a direction opposite from said battery assembly or are disposed inside a hollow sidewall of said enclosure assembly.

11. The battery pack as recited in claim 10, comprising a close-out panel mounted beneath said plurality of integrated heat transfer devices, and wherein a first coolant chamber is established between said floor and said close-out panel.

12. The battery pack as recited in claim 11, comprising a sidewall that extends vertically relative to said floor, and a second coolant chamber extends inside said sidewall.

13. The battery pack as recited in claim 12, comprising a center rail disposed between said battery assembly and a second battery assembly, and a third coolant chamber extends inside said center rail.

14. A method, comprising:
housing a battery assembly within an enclosure assembly of a battery pack; and
directing coolant through a first coolant chamber of the enclosure assembly to facilitate heat transfer with a first side of the battery assembly and through a second coolant chamber to facilitate heat transfer with a second side of the battery assembly;
wherein the battery assembly is fluidly isolated from the first and second coolant chambers, wherein a first heat transfer device is disposed between the first side and a floor of the enclosure assembly; and
wherein a second heat transfer device is disposed between the second side and a side wall of the enclosure assembly.

15. The method as recited in claim 14, wherein the first side is a bottom side of the battery assembly and the second side is an outboard side of the battery assembly.

16. The method as recited in claim 15, wherein the enclosure assembly is arranged to facilitate heat transfer with a third side of the battery assembly, and the third side is an inboard side of the battery assembly.

17. The method as recited in claim 14, wherein directing the coolant includes communicating the coolant across a plurality of heat transfer devices disposed inside the first coolant chamber.

18. A battery pack, comprising:
a sealed enclosure assembly including a tray;
a battery array against a floor of said tray;
a heat transfer device protruding from said floor;
a close-out panel beneath said heat transfer device;
a first coolant chamber between said floor and said close-out panel; and
a second coolant chamber inside a vertical sidewall of said tray;
wherein said battery array is fluidly isolated from said first and second coolant chambers.

* * * * *